(12) United States Patent
Garcia

(10) Patent No.: US 6,357,391 B1
(45) Date of Patent: Mar. 19, 2002

(54) FISH TANK WITH FILLING BY ASPIRATION OF AIR

(75) Inventor: Carlos Aviles Garcia, Barcelona (ES)

(73) Assignee: Antonio Luis Garcia Herrero (ES)

( * ) Notice: Subject to any disclaimer, the term of this patent is extended or adjusted under 35 U.S.C. 154(b) by 0 days.

(21) Appl. No.: 09/539,994

(22) Filed: Mar. 30, 2000

(30) Foreign Application Priority Data

Apr. 6, 1999 (ES) .............................................. 9900771

(51) Int. Cl.[7] .............................................. A01K 63/00
(52) U.S. Cl. ...................................................... 119/250
(58) Field of Search ................................ 119/254, 253, 119/245, 248, 249, 250, 251, 257; D30/101, 105

(56) References Cited

U.S. PATENT DOCUMENTS

| 192,595 A | * | 7/1877 | Palen et al. ................... 119/250 |
| 3,903,844 A | * | 9/1975 | Greenia ....................... 119/250 |
| 5,067,439 A | * | 11/1991 | Hand ........................... 119/250 |
| 5,634,433 A | * | 6/1997 | Schmitt ....................... 119/250 |
| D429,387 S | * | 8/2000 | Wise ........................... D30/101 |

* cited by examiner

Primary Examiner—Peter M. Poon
Assistant Examiner—Judith A. Nelson
(74) Attorney, Agent, or Firm—Lackenbach Siegel

(57) ABSTRACT

A fish tank with filling by aspiration of air which includes a lower zone (1) and an upper zone (2), the lower zone (1) being hermetically sealed by its sides and lower part and having has an opening (1a) in its upper part in the manner of a receptacle, while the upper zone (2) is hermetically sealed by its sides and upper part (2c) and has an opening (2a) in its lower part in the manner of an inverted receptacle, and the opening (2a) is comprised at a height slightly below the opening (1a) of the lower zone (1), there being in the upper part (2c) of the upper zone (2) a system of aspiration of air formed by a pump (3) and a non-return valve (5), which is suitable for extracting the air from the upper zone (2), preventing the entry of air or water through the upper part (2c) above said upper zone (2), while in the part (2b) inside of the upper zone (2) there is installed a small grating (4) in order to prevent access of the fish to possible air bubbles inside the upper zone (2).

11 Claims, 1 Drawing Sheet

FISH TANK WITH FILLING BY ASPIRATION OF AIR

OBJECT OF THE INVENTION

The present patent application has as its object a fish tank with filling by aspiration of air, which brings to the function for which it is intended various advantages which will be stated further on, aside from others inherent to its layout and constitution.

BACKGROUND OF THE INVENTION

At the present time and as a reference to the state of the art it should be mentioned that many and various types of fish tanks are known, the majority of which are comprised of receptacles of transparent material of usually regular shapes, such as rectangular tanks, bowls, etc., which are filled with water to a certain level and at the same time are provided with an adequate installation to maintain the water contained therein in optimum condition.

DESCRIPTION OF THE INVENTION

The fish tank with filling by aspiration of air, the object of the present invention, is characterized by having two well differentiated zones, a lower zone and an upper zone.

The lower zone is hermetically sealed by its sides and by the lower part and has an opening in the upper part by way of a receptacle.

On the other hand the upper zone is hermetically sealed by the sides and by the upper part, having an opening in the lower part by way of an inverted receptacle so that said opening is contained at a height slightly below the opening of the lower zone, so that when said lower zone is filled with water, the water reaches the opening of the upper zone before it overflows through the opening of the lower zone.

In the higher part of the upper zone there is provided a system of aspiration of air, such as a pump or the like, provided with a non-return valve, preventing any entry of air or water through the part above said zone.

Likewise in the interior of the upper zone and in its above part there is installed a small grating or the like in order to prevent access by the fish to possible air bubbles which have remained in the interior the upper zone.

Said fish tanks are filled by the opening of the lower zone until the water reaches a level intermediate between the openings of the two upper and lower zones, and then the aspiration of the air proceeds by means of the system of aspiration used, at the same time that there is a continuous introduction of water by the opening of the lower zone so that the water level is always situated between the openings of the two zones, the water level of the upper zone rising without leaving air space while the water level of the lower zone always remains included between that of the two openings of said zones.

To supplement the description which will be carried out subsequently and for the purpose of assisting in a better comprehension of its characteristics, the present invention is accompanied by a delineation set in whose figures are represented in a non-limiting illustrative way the more important details of the invention.

DESCRIPTION OF ONE EXAMPLE OF EMBODIMENT OF THE INVENTION

Figure 1:
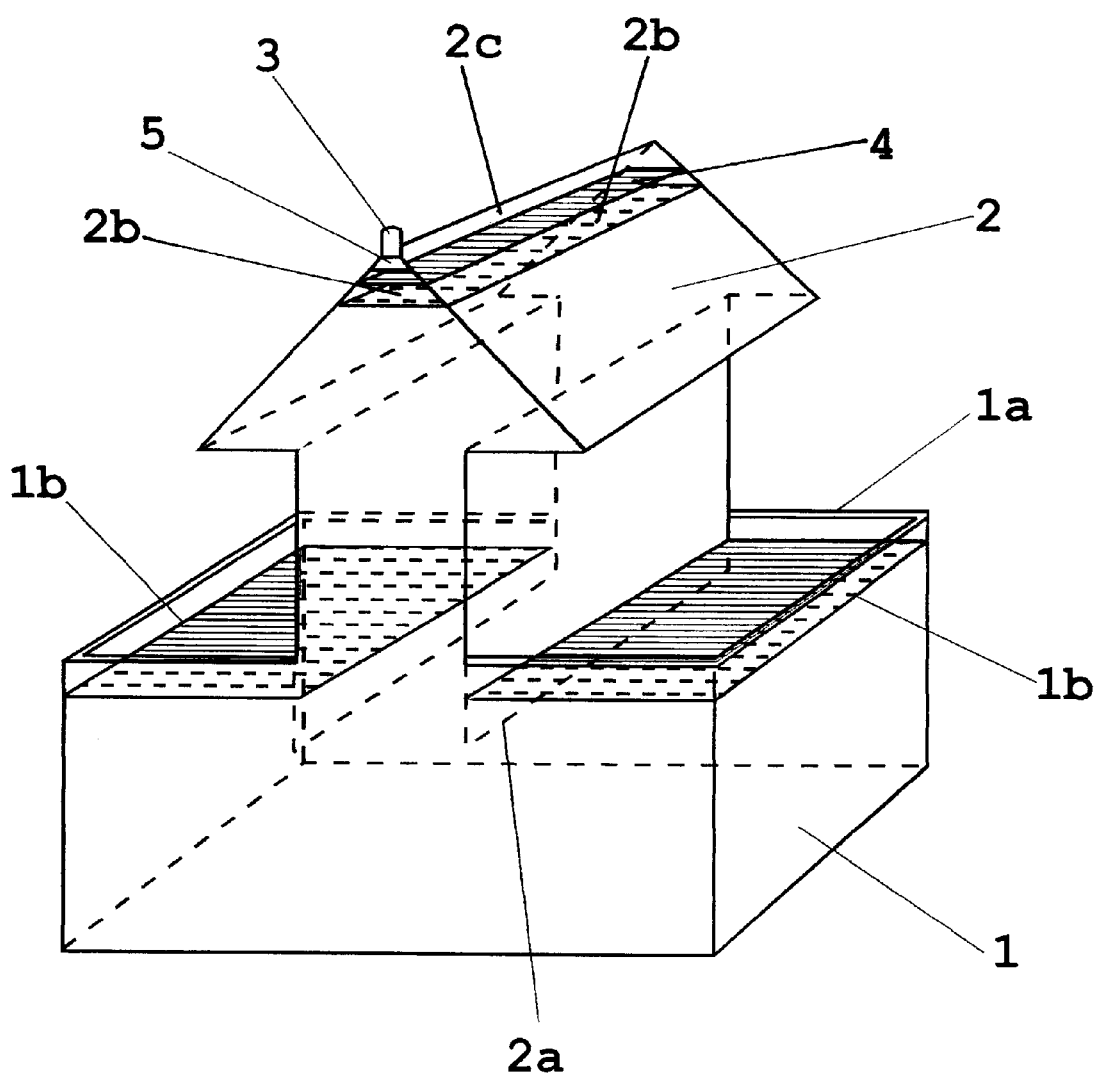
FIG. 1. Shows a schematic view in perspective of one practical embodiment of the invention.

In view of the figures commented upon and in accordance with the adopted numbering system, there may be observed in the same one example of embodiment of the invention, which is comprised of a fish tank with filling by aspiration of air, which includes a lower zone (1) and an upper zone (2).

The lower zone (1) is hermetically sealed by its sides and lower part, having an opening (1a) in its upper part in the manner of a receptacle.

The upper zone (2) is hermetically sealed by the sides and upper part, having an opening (2a) in its lower part in the manner of an inverted receptacle with the peculiarity that said opening (2a) is contained at a height slightly below the opening (1a) of the lower zone (1).

In the highest part of the upper zone (2) there is installed a system for the aspiration of air, such as a pump (3) or the like, provided with a non-return valve (5), which is able to extract the air from the upper zone (2), at the same time as preventing the entry of air or water through the upper part (2c) above said upper zone (2).

Likewise in the part above the inside of the upper zone (2) there is a small grating (4) which prevents the fish from being able to access possible bubbles of air inside the upper zone (2).

The described disposition makes it possible to fill the lower zone (1) with water up to an intermediate level (1b) between the two openings (1a) and (2a) of the respective zones (1) and (2), and to aspirate the air by means of the pump (3). Aspiration of air from upper zone (2), by definition and as shown and described, creates a partial vacuum in upper zone (2) when lower zone (1) is filled with water to the intermediate level (1b). The partial vacuum causes the water in lower zone (1) to rise up into upper zone (2) while water is continuously being introduced through the opening (1a) of the lower zone, so that the water level is kept situated between the openings (1a) and (2a) of both zones.

In this manner the water level of the upper zone (2) rises up until it reaches a level (2b) immediately on top of the small grating (4) and does not leave an air space, while the water level (1a) of the lower zone (1) is always kept included between the openings (1a) and (1b) of the respective lower (1) and upper (2) zones.

The invention in its essence may be reduced to practice in other forms of embodiment which differ in detail from what was indicated by way of example in the description and to which will extend likewise the patent protection which is petitioned. It may therefore be embodied in any form and size and with the most suitable materials and means, for all that still being comprehended in the spirit of the patent claims.

What is claimed is:

1. A fish tank with filling by aspiration of air, characterized in that it includes a lower zone (1) and an upper zone (2) so that the lower zone (1) is hermetically sealed by its sides and lower part, having an opening (1a) in its upper part as a receptacle, while the upper zone (2) is hermetically sealed by its sides and upper part (2c), having an opening (2a) in its lower part like an inverted receptacle, with the particularity that the opening (2a) of the upper zone (2) is comprised at a height slightly below the opening (1a) of the lower zone (1), there being provided in the upper part (2c) of the upper zone (2) a system of aspiration of air with a pump (3) provided with a non-return valve (5), the system of aspiration formed by the pump (3) and the non-return valve (5) being able to extract the air from the upper zone (2), at the same time as preventing the entry of air or water through the upper part (2c) above the upper zone (2), while the part (2b) inside of the upper zone (2) has installed in it a small grating (4) that prevents the access of fish to possible air bubbles inside the upper zone (2).

2. The fish tank according to claim 1, characterized in that the opening (1a) of the lower zone (1) is adapted as a receptacle for filling the lower zone (1) with water, and in that the opening (2a) of the upper zone is immersed in water inside the lower zone (1) and allows water to ascend to the upper part (2c) of the upper zone (2).

3. The fish tank according to claim 1, characterized in that the water level in the lower zone (1) remains between the height of the opening (1a) of the lower zone (1) and the height of the opening (2a) of the upper zone (2).

4. A fish tank according to claim 1, characterized in that the water level in the upper zone (2) remains at the part (2b) inside of the upper zone (2) and above the position of the grating (4).

5. A fish tank filled by aspiration of air, comprising
   a lower zone adapted to contain water, and having an upper part with an upper opening therein;
   an upper zone adapted to contain water, and having a lower part with a lower opening therein, said lower opening disposed at a height below said upper opening; and
   means for aspirating air having a pump with a non-return valve, said means for aspirating air being operatively connected with said upper zone for removing air from said upper zone,
   whereby said upper zone is filled with water by filling said lower zone with water to an intermediate level above said lower opening and below said upper opening, and actuating said means for aspirating air to remove air from said upper zone to create a partial vacuum so that said water rises from said lower zone into said upper zone.

6. The fish tank of claim 5, further comprising a grating disposed in said upper zone and adapted to prevent a fish in said upper zone from accessing possible bubbles of air inside said upper zone.

7. The fish tank of claim 5, wherein said upper zone has a top part, and wherein said means for aspiration of air is operatively connected to said top part, whereby air may be aspirated from said upper zone and water entering said upper zone may rise to a level that leave no air space in said upper zone.

8. A method of filling a fish tank by aspiration comprising the steps of:
   providing a lower zone having an upper portion with an upper opening therein;
   providing an upper zone having a lower portion with a lower opening therein, said upper and lower zones being spatially disposed such that said lower opening is disposed at a height below said upper opening;
   filling said lower zone with water to an intermediate water level that is above said lower opening and below said upper opening; and
   aspirating an amount of air from said upper zone to create a partial vacuum, whereby said water rises up into said upper zone.

9. The method of claim 8, further comprising the step of introducing water to said lower zone while air is being aspirated from said upper zone, whereby said intermediate water level remains above said lower opening and below said upper opening while said water is rising up into said upper zone.

10. The method of claim 8, wherein air is aspirated from said upper zone until said water rises into said upper zone to a level that does not leave an air space in said upper zone.

11. The method of claim 8, further comprising the step of providing a grate in said upper zone adapted to prevent a fish in said upper zone from accessing possible bubbles of air inside said upper zone.

\* \* \* \* \*